United States Patent [19]
Bono et al.

[11] Patent Number: 5,218,677
[45] Date of Patent: Jun. 8, 1993

[54] COMPUTER SYSTEM HIGH SPEED LINK METHOD AND MEANS

[75] Inventors: Richard C. Bono; Henry R. Brandt, both of Poughkeepsie; Harold F. Cavagnaro, Tillson; Arlin E. Lee, Poughkeepsie; Darwin W. Norton, Jr., Stone Ridge; Eric T. Shalkey, Kingston; David L. Silsbee, Cottekill, all of N.Y.; David S. Wehrly, Montrose, Pa.; Clifford T. Williams, Lake Katrine; Terrence K. Zimmerman, Red Hook, both of N.Y.

[73] Assignee: International Business Machines corporation, Armonk, N.Y.

[21] Appl. No.: 358,774

[22] Filed: May 30, 1989

[51] Int. Cl.⁵ .................. G06F 3/00; G06F 13/00
[52] U.S. Cl. .................. 395/275; 395/250; 364/927.99; 364/935.2; 364/957.1; 364/DIG. 2
[58] Field of Search ... 364/200 MS File, 900 MS File

[56] References Cited

U.S. PATENT DOCUMENTS

| | | | |
|---|---|---|---|
| 4,476,524 | 10/1984 | Brown et al. | 364/200 |
| 4,669,043 | 5/1987 | Kaplinsky | 364/200 |
| 4,757,446 | 7/1988 | Trottier et al. | 364/200 |
| 4,860,192 | 8/1989 | Sachs et al. | 364/200 |

OTHER PUBLICATIONS

Draft Proposed American National Standard for Information Systems, X3T9.3/88-023, Mar. 17, 1989 "High Speed Channel" pp. 1-46.

*Primary Examiner*—Gareth D. Shaw
*Assistant Examiner*—John Q. Chavis
*Attorney, Agent, or Firm*—Robert L. Troike

[57] ABSTRACT

This embodiment provides apparatus and method for implementing a High Speed Link (HSL) such as the newly proposed ANSI High Performance Parallel Interface (HIPPI) standard on processors complexes like the IBM 3090 having a paging store with an independent bus. A high speed link adapter (HSLA) including input and output buffers and controls is coupled to the independent bus under program control. Program access to high speed link is obtained by an extension to the Page-in and Page-out instructions.

9 Claims, 7 Drawing Sheets

COMPUTER SYSTEM HIGH SPEED LINK METHOD AND MEANS

BACKGROUND OF THE INVENTION

This invention relates to the control of data transfer between main storage and high speed external cabling.

Processor-to-I/O devices and processor-to-processor communication is well known in the prior art. Prior to this invention, communication speeds for IBM peripherals were limited to 4.5 MBytes/sec when using the standard IBM System/370 OEMI channel.

A newly proposed American National Standards Institute (ANSI) X3T9.3 link for information handling referred to as High Performance Parallel Interface (HIPPI, formerly referred to as High Speed Channel or HSC and HPPI has been proposed for peak rates of 800 or 1,600 Mbit/sec between data processing equipment using multiple twisted-pair copper cabling at distances up to 25 meters. A copy of this standard is provided as Appendix A.

A uniprocessor system that includes a system controller (SC) at the focal point in the system, a main storage (MS) including a main storage controller (MSC), a channel processor (CH) and one central processor (CP) is well known. Also multiprocessor systems having multiple system controllers (SC) and associated main storage, channel processors and multiple central processors are known.

An expanded storage such as paging storage is also well known. Brown et al. U.S. Pat. No. 4,476,524 teaches providing an independent data bus path between a random access page storage (PS) and a main storage where this independent data bus does not pass through any channel processor or central processor. Page data transfers on the independent data bus can be controlled either asychronously by a channel processor or synchronously by a central processor (independent of any CH operation). Novel CP instructions enable the CP to synchronously control the transfer of pages in either direction on the independent bus.

SUMMARY OF THE INVENTION

In accordance with the present invention connection to a high speed link such as the HIPPI is provided for such uniprocessor systems having this paging control is via this independent bus using this independent bus path by coupling a high speed link adapter (HSLA) between this independent bus and the high speed link. The high speed link adapter includes input and output buffers and control means for transferring data to and from the main storage (MS) via this independent bus and including means for providing an interrupt signal indicating the presence of data at the input buffers. This interrupt signal is coupled to the central processor for control thereof.

DESCRIPTION OF ONE EMBODIMENT OF THE PRESENT INVENTION

Figure 1:
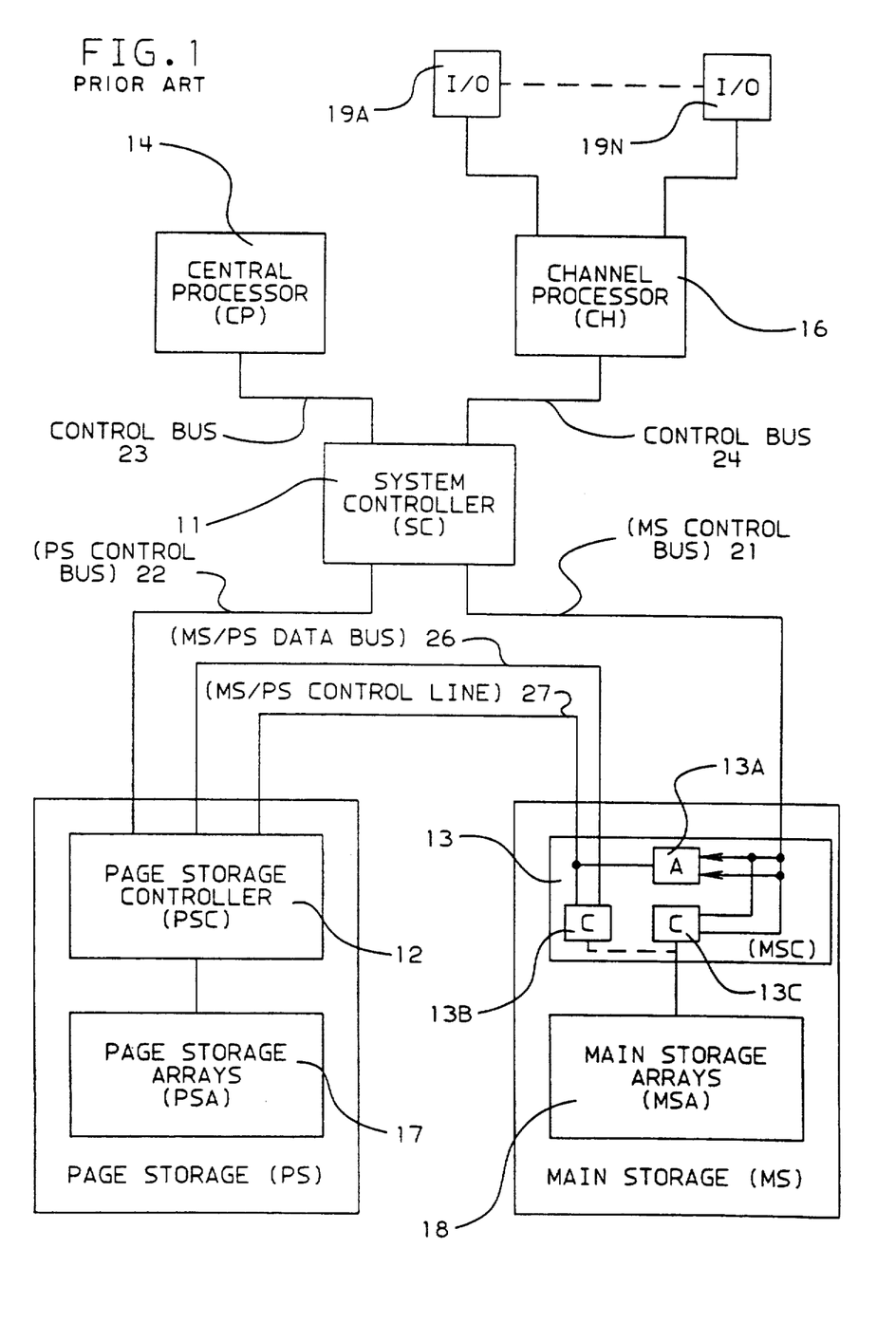
FIG. 1 is a block diagram of a uniprocessor according to the prior art.

FIG. 1 illustrates a block diagram arrangement of a uniprocessor system according to the prior art teaching in Brown et al. U.S. Pat. No. 4,476,524, assigned to the same assignee as the present invention and incorporated herein by reference. The various processor elements and interconnecting busses and their function are fully described in this application.

Referring to the block diagram arrangement of FIG. 1, a uniprocessor system containing the invention a system controller (SC) 11 is a focal point in the system receiving the busses from a page storage controller (PSC) 12, a main storage controller (MSC) 13, a central processor (CP) 14, and a channel processor (CH) 16. The PSC 12 accesses data in page storage arrays (PSA) 17. MSC 13 accesses data in main storage arrays (MSA) 18, and the channel processor 16 accesses data in any one of I/O devices 19A through 19N. The page storage (PS) is comprised of PSC 12 and PSA 17. The main storage (MS) is comprised of MSC 13 and MSA 18.

A bidirectional page data bus 26 connects between MSC 13 and PSC 12 and is an independent data bus that enables a page transfer directly between PS and MS. A page transfer on bus 26 is controlled by either CP 14 or CH 16 by means of control signals sent on either control bus 23 or control bus 24. The page address in PS is sent to PS from the SC to the MSC on the MS data bus and then from MSC to PS on the PS data bus via gates 13A and 13B which are activated by a control line signal on the MS bus to connect the page address on the MS data lines to the MS/PS data bus 26 while activating the MS/PS control line 27 to indicate the PS page address to PSC. After sending the page address to PS to initiate a page transfer, all further access addresses (e.g. line addresses) in the page are generated internally in PS, and therefore need not be communicated on any bus.

However, MS operates in the conventional manner (except for the operation of the illustrated controls 13A and 13B) and requires a command from the SC to conventional controls 13C before MS can access any unit of data, e.g. line of 128 bytes. The SC command's line address is therefore transferred to MS in the conventional manner, which permits the SC to make a separate priority decision for each line request command if plural requests are simultaneously made. Thus each line address to be accessed in MS is transferred to MS on the MS control bus 21.

Because of the necessity for an independent priority decision to be made by the SC each time an MS access is to be made so that the highest priority requestor is given access to MS at any given time, each MS/PS line transfer gates 13B is subject to this MS priority decision by the SC. The result is that if another requestor is making a higher MS priority request than the requestor of the MS/PS transfer when any line in a page is to be transferred, the MS/PS transfer via gate 13B must pause until the MS/PS transfer requestor gets MS priority.

To permit an independent SC priority decision on each MS line access during the page transfer, the SC must be informed of each line transfer on the independent MS/PS data bus so that the SC does not try to access MS at the same time, since only one MS access can be made in the same MS array at the same time.

In the described embodiments, SC commands to MS are generated in response to a requestor command, i.e. from any CP or CH. Therefore, after each line is transferred on the MS/PS bus in either direction, a signal is sent from PS back to the page transfer requestor either to request the next line or to indicate that the page transfer is complete. In response to a PS next line request, the page transfer requestor sends a command to the SC for the next line transfer in the page, which contends with any other MS request(s) existing in the SC. When this command is given MS bus priority by the SC, the MS access is made.

This page transfer line command is also sent to PS to inform PS that MS priority has been requested and therefore PS should access the line it is currently addressing.

The MS/PS bus may be designed as a bidirectional bus that transfers a subline unit (e.g. doubleword or quadword) in either direction at a time, e.g. 16 DW or 8 QW transfers per line. Since the PS access time may be different from the MS access time, and the line access command may reach MS and PS at somewhat different times, some buffering may be needed on the MS/PS bus between PS and MS to insure all page data is transferred.

In FIG. 1 no data bus is shown between CP 14 and SC 11 or between CH 16 and SC 11 because such data bus is not used by the subject invention, even though such CP and CH data busses exist in the system for reasons not pertinent to this invention.

Figure 2:
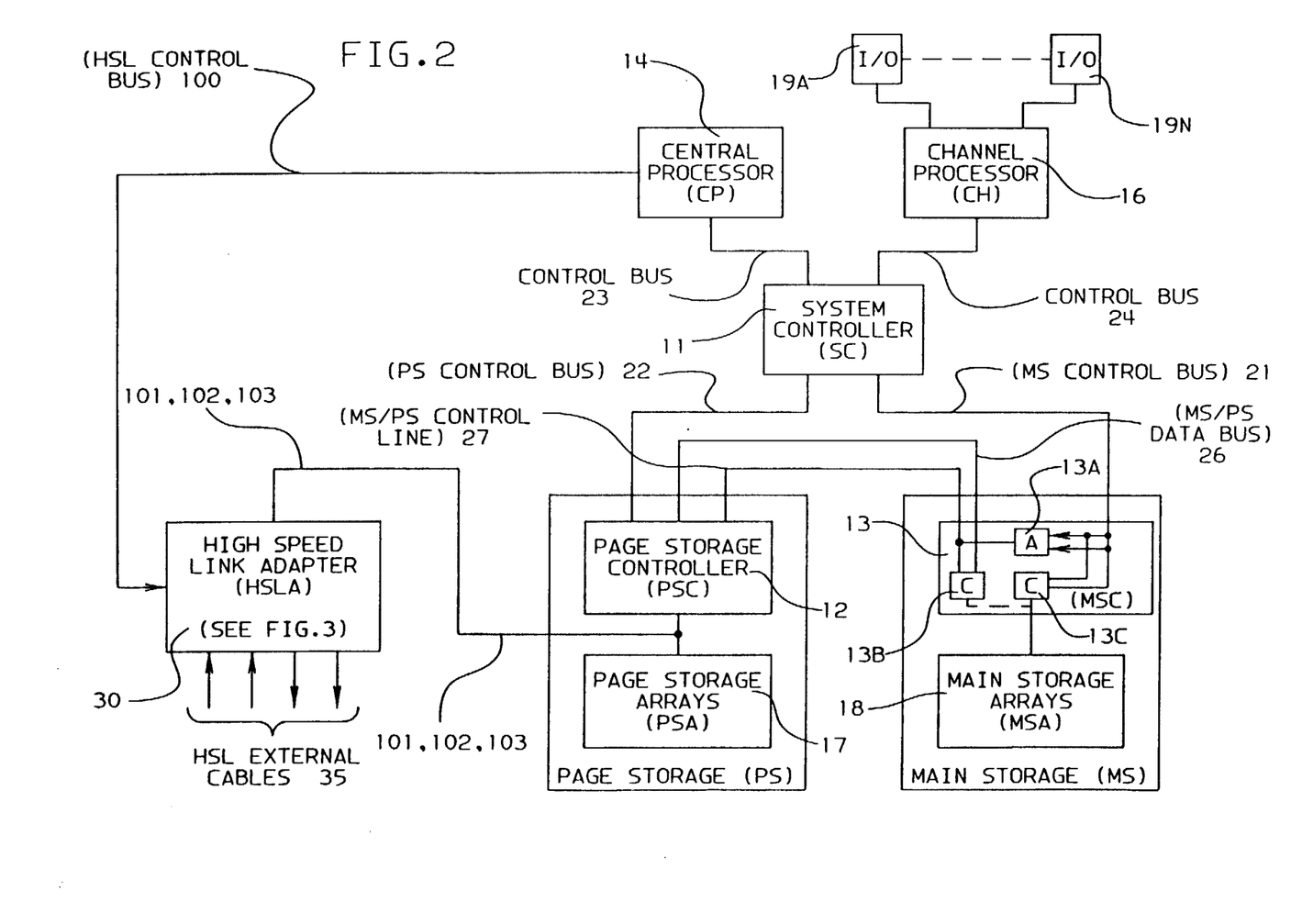
FIG. 2 is a block diagram of a uniprocessor showing one embodiment of the present invention using a High Speed Link Adapter (HSLA).

FIG. 2 illustrates the additional circuitry added to effect the connection of the system to a High Speed Link (HSL) which may be like the proposed HIPPI standard. A pair is required for full-duplex (two way) data flow. The embodiment of this way of implementation utilizes available physical space at the physical page storage array location where the Page Storage Controller (PSC) to Page Storage Arrays (PSA) bus cables 102 and 103 and control cable 101 are readily available. The referenced Brown et al. patent shows in FIG. 9 the fetch data bus 102 as 136 and the store data bus 103 as 137. Signal cabling is modified to allow data and control lines to be routed first to the PSC then into a High Speed Link Adapter (HSLA) 30. The external HSL cables 35 are fully described in the proposed HIPPI American National Standards (ANSI). The characteristics include one or two copper twisted pair cables. Each HSL or HSC is a simplex channel capable of transferring data in one direction only. Two HSLs or HIPPI are used for a full-duplex operation. The data transfers are performed and flow controlled in increments of bursts each bust containing 256 words. An HSL or HIPPI of 32 bit words is switched to 64-bit words by adding two additional cables (one for each direction). Signal cabling 100 between the HSLA and the Central Processor (CP) is added to provide for control signalling between the System Control Program (SCP) operating in the CP and the HSLA 30.

Figure 3:
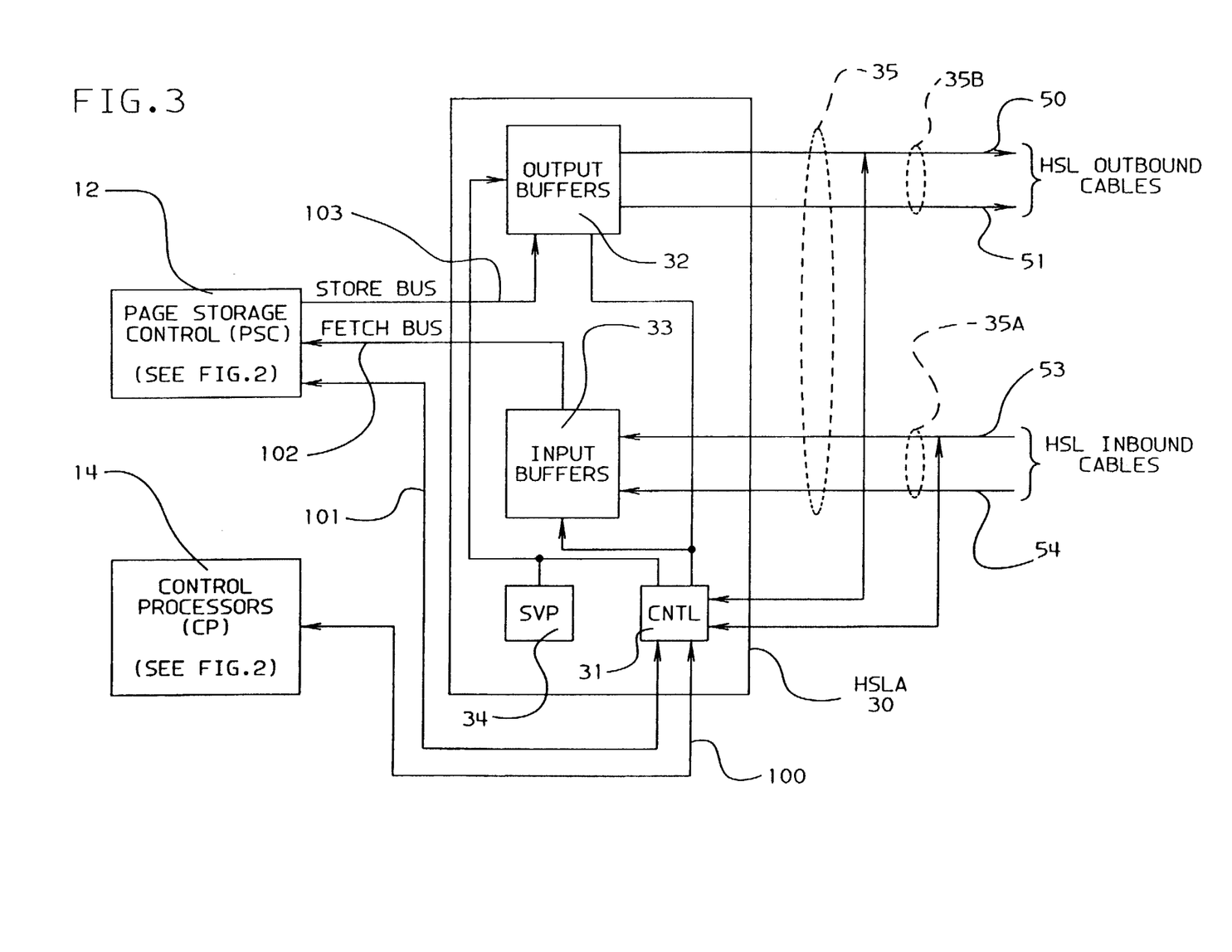
FIG. 3 is a block diagram of the novel circuit operation within the high speed link adapter for an embodiment of the invention.

FIG. 3 illustrates a block diagram arrangement of the circuitry in the HSLA 30. Four major elements are depicted; namely control 31, multipage output buffers 32, multipage input buffering 33 and service processor 34. The signal paths include the external HSL cabling 35, data and control cable 101 to the PSC 12 and signal cable 100 to the CP 14. The control 31 provides for overall supervision of the HSLA 30. Among its functions are the management of the input buffers 33 and output 32 page buffers, control of data fetching and storing into the buffer elements under direction of signals passed through the PSA 17, interrupt and status information presented to the CP 14 and the recognition and handling of control signals sent and received on the external HSL cables 35.

Figure 4:
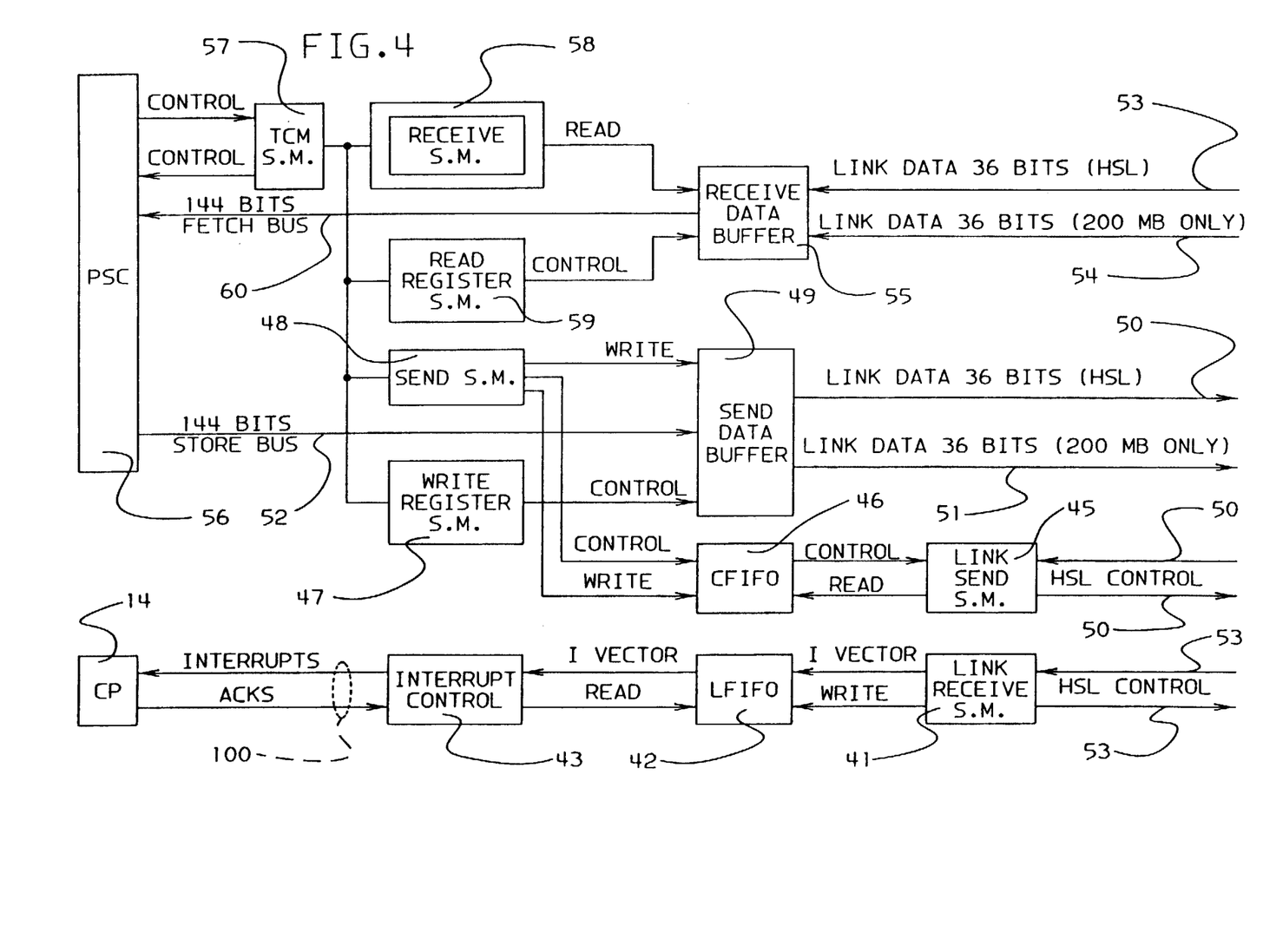
FIG. 4 is a diagram showing the major elements of the HSLA circuitry.

FIG. 4 illustrates a more detailed depiction of this implementation of the invention. Various state machines (SM) are utilized in the embodiment. Control signals contained on the outbound HSL external ANSI HIPPI multi-wire cable 53 and 54 of 35A are detected and reacted to by the Link Receive SM 41. Output from this SM 41 is presented to a first-in first-out (FIFO) control buffer element 42 and ultimately through interrupt control circuitry 43 to present interrupts to and receive acknowledgements from the CP 14 providing for program synchronization. On the outbound cables 50 and 51 of 35B signals are detected and reacted to by the Link Send SM 45. Interface signals to the SM 45 provide for packet count control in the FIFO control buffer element 46. Another pair of SM's, Write Register SM 47 and Send SM 48, provide for control of HSL outbound data transfer through the Send Data buffer 49. Depending on whether the HSL is operating in 800 Mbits/sec (100 Mbytes/sec) or 1600 Mbits/sec (200 Mbytes/sec), either two or four external cables are installed. In the case of 100 Mbyte mode, only one outbound data and control cable 50 is required. In 200 Mbyte mode, an additional outbound cable 51 is required. A jumper at SM 47 in the control circuitry selects which mode the Send Data Buffer 49 is operating in. Outbound data is provided to the Send Data Buffer 49 through a data bus contained in the store bus 52.

Inbound data is subject to the same 100 versus 200 Mbyte/sec decision selected by the aforementioned jumper in SM 59 which changes the mode in the Receive Data Buffer 55. In the 100 Mbyte mode, only one external cable 53 is utilized. In 200 Mbyte mode, an additional internal cable 54 is included. Inbound data is received and buffered in the Receive Data buffer 55. Control information presented to the CP through the Interrupt Control element 43 alerts the operating system to issue a page-in instruction to move data into the PSC 12 under control of the TCM SM 57, Receive SM 58 and Read Register SM 59. Received data is presented onto the PSC Fetch Bus 60 to be ultimately received into MS.

Figure 5:
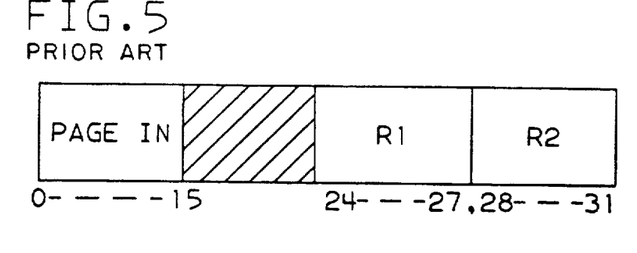
FIGS. 5 and 6 illustrate prior art central processor (CP) instructions for causing a Page-in or Page-out transfer of a page between MS and either PS or HSL.
Figure 6:
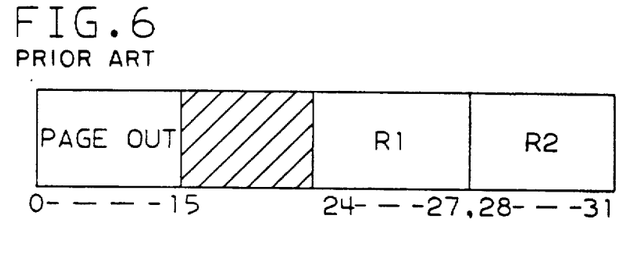
Figure 7:
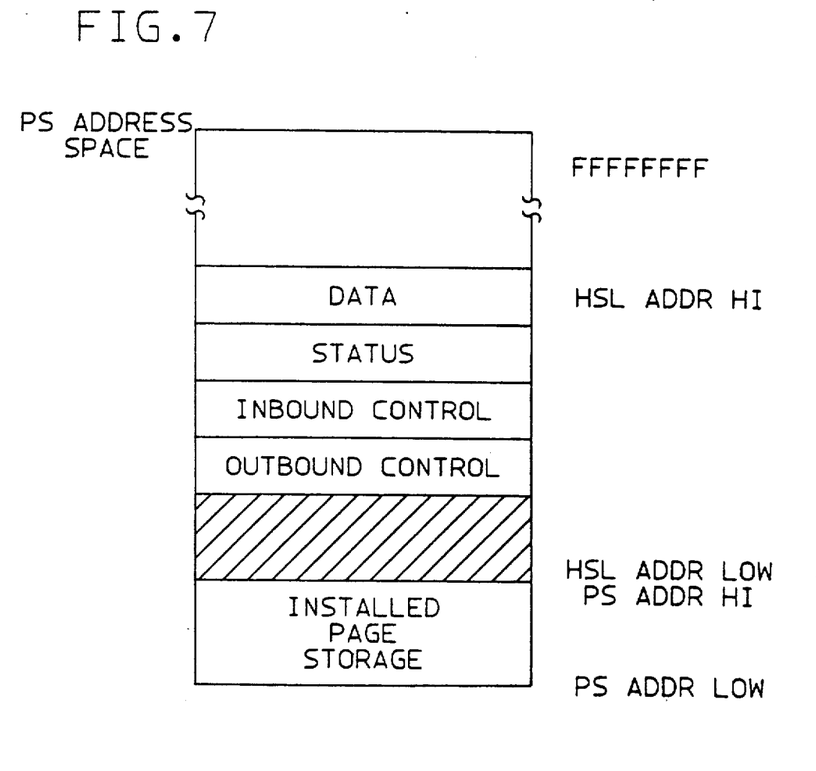
FIG. 7 illustrates the relationship between installed PS and HSL address space.

FIGS. 5 and 6 depict the Page-in/Page-out instructions fully described in U.S. Pat. No. 4,476,524. The page address generated by execution of these instructions are examined by the PS and HSLA circuitry to determine whether the effective resultant address is within the installed PS range or beyond it. If within the PS range, normal page-in page-out operations continue between MS and the PS. Addresses beyond the installed PS are examined by the HSLA circuitry to determine if the request is for HSLA operation. The addressing scheme in this embodiment is shown in FIG. 7. If the HSLA circuitry determines the effective address to be pertinent to the HSL operations, four unique addresses are decoded as shown. This provides for the reading and writing of data, status, and HSLA control registers.

Figure 8:
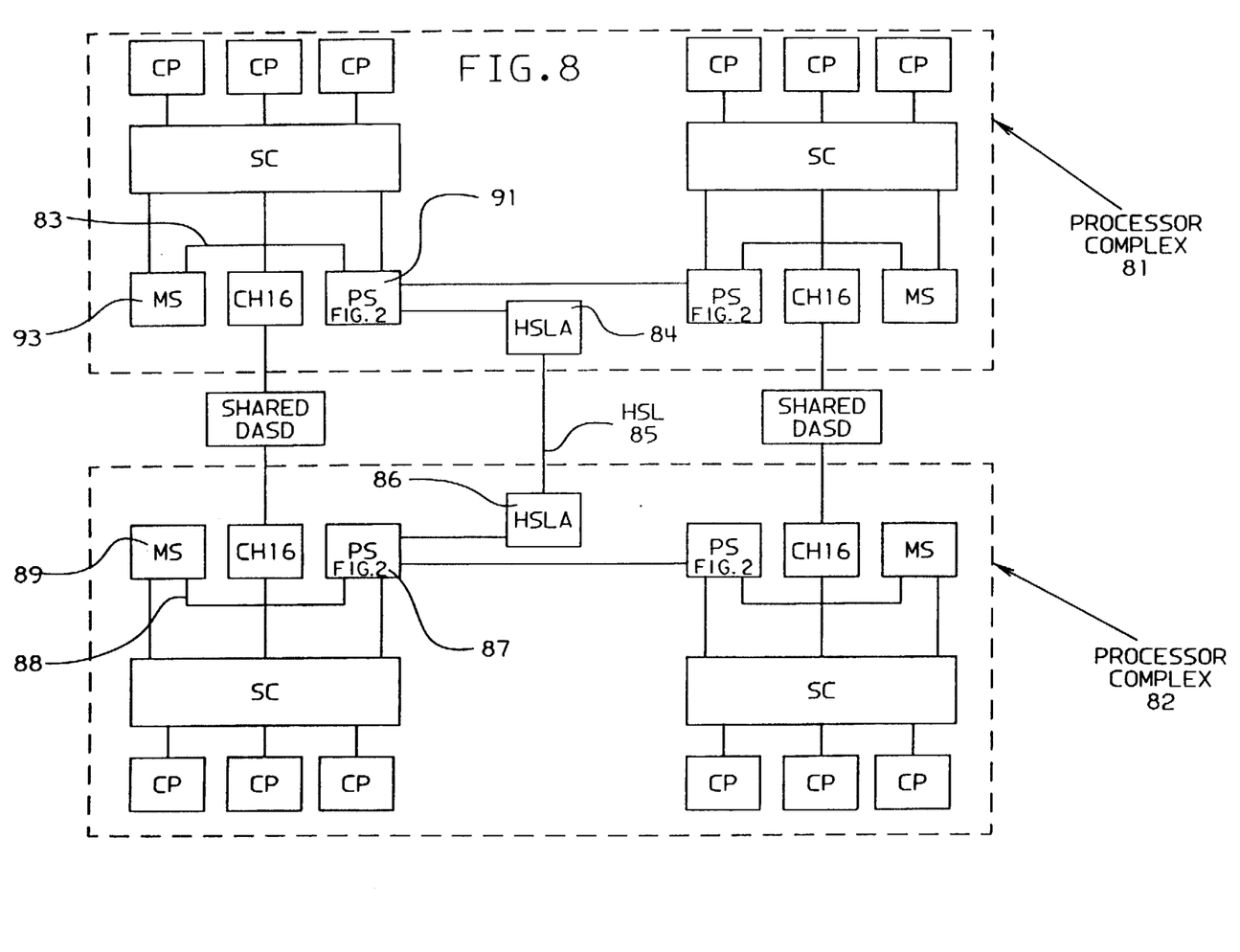
FIG. 8 illustrates a multiprocessor to multiprocessor coupling.

While the previously described system illustrates the coupling of a uniprocessor system to the high speed link, this system is equally applicable to use to couple two multiprocessors as shown in FIG. 8. As illustrated, there is the multiprocessor complex 81 and multiprocessor complex 82. In this example, the independent bus 83 is coupled between the main storage (MS) 93 and the page storage (PS) 91. This bus 83 is coupled via the page storage controller (PSC), which corresponds to PSC 12 in FIG. 2, to the high speed link adapter (HSLA) 84 and to the high speed link HSL 85. At the other end of the link is another high speed link adapter (HSLA) 86 coupled to the page storage 87 of multiprocessor 82 and via its independent bus 88 to main storage 89. The adapters 84 and 86 are like adapter 30 with the store and fetch buses coupled to the buffers 32 and 33. The outbound cables 35B of the link 85 at adapter 84 are the inbound cables 35A at adapter 86 and the inbound cables 35A at adapter 84 are the outbound calbes at adapter 86. In this manner two multiprocessors 81 and 82 can be coupled through such a high speed link.

Figure 9:
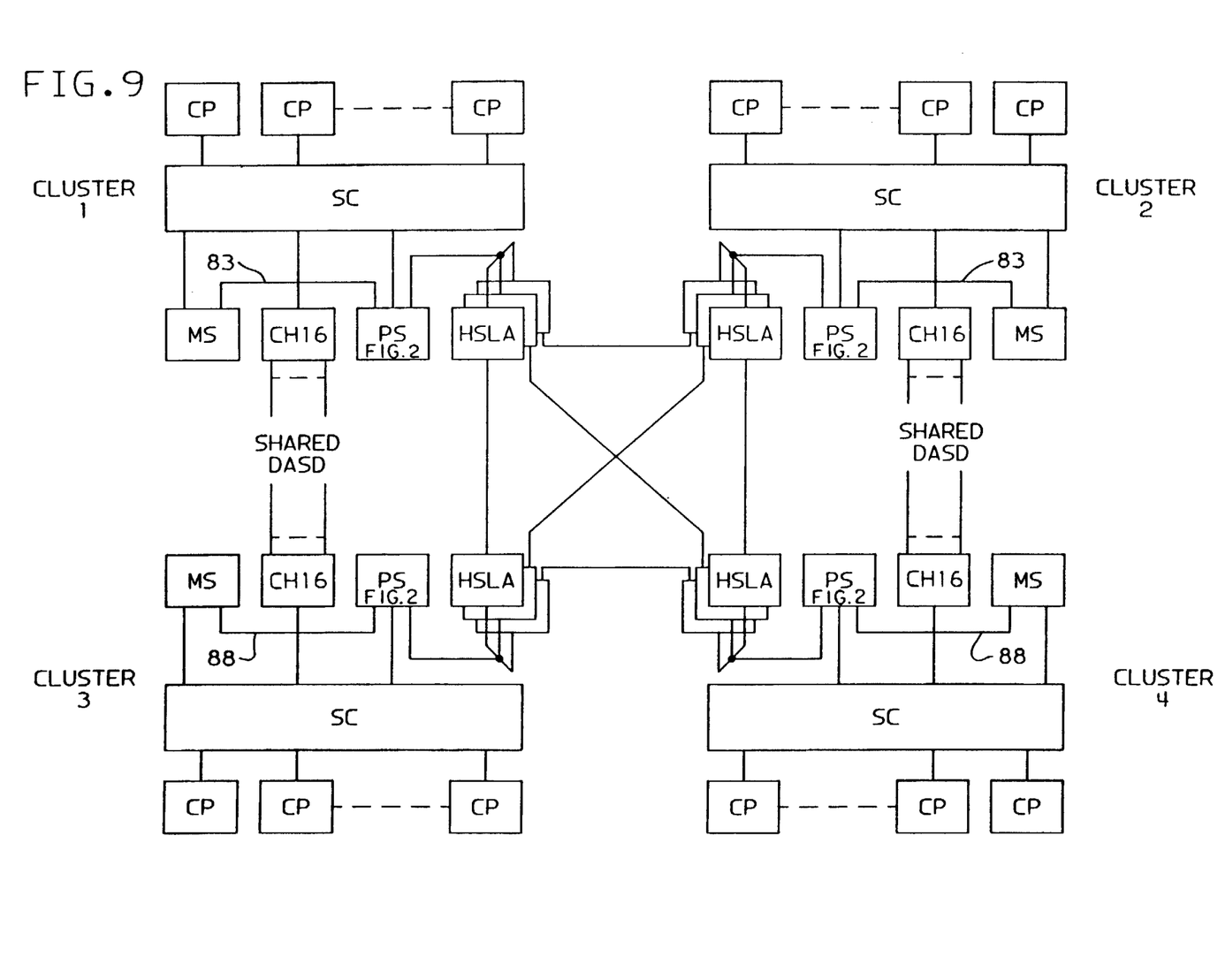
FIG. 9 illustrates a multi-cluster high speed link adapter coupling.

An extension of the embodiment described herein is to provide a multi-cluster complex of systems interconnected in a combination of configurations. One such configuration is shown in FIG. 9. In this example a plurality of four, three processor complexes are connected in such a way to allow any-to-any simultaneous communication between the individual clusters. In the example each of the processor clusters is implemented with three HSLAs per complex in a symmetrical arrangement.

Although this invention has been shown and described with respect to plural embodiments thereof, it should be understood by those skilled in the art that various changes and omissions in the form and details of the invention may be made therein without departing from the spirit and scope of the invention.

We claim:

1. A processor complex to processor complex system comprising:
   a first processor complex including a system controller, a first central processor providing addresses including a special link coupling address and control signals, a main storage having a memory storage coupled to a memory controller, said memory controller including first and second terminals where said system controller is coupled between said first central processor and said first terminal of said memory controller and thereby provide said special link coupling address and control signals to said memory controller, a channel processor and an input/output bus with said system controller coupled between said first terminal of said memory controller and said channel processor and said channel processor coupled between said system controller and said input/output bus, and a first coupling link separate from and higher speed than said input/output bus and independent of said channel processor coupled at one end directly to said second terminal of said memory controller, said memory controller providing direct access between said first coupling link and said memory storage bypassing said input/output bus and said system controller in response to said special link coupling address from said first central processor to said first terminal of said memory controller;
   a second processor complex including a second system controller, a second central processor providing addresses including a second special link coupling address and control signals, a second main storage having a second memory storage coupled to a second memory controller, said second memory controller including first and second terminals where said second system controller is coupled between said second central processor and said first terminal of said second memory controller and thereby provide said second special link coupling address and control signals to said second memory controller, a second channel processor and a second input/output bus with said second system controller coupled between said first terminal of said second memory controller and said second channel processor and said second channel processor coupled between said second system controller and said second input/output bus, and a second coupling link separate from and higher speed than said input/output bus and independent of said second channel processor coupled at one end directly to said second terminal of said memory controller, said second memory controller providing direct access between said second coupling link and said second memory storage bypassing said input/output bus and said system controller in response to said second special link coupling address from said second central processor to said first terminal of said second memory controller;
   a high speed link pair for bidirectional coupling;
   a first high speed link adapter coupled between said first coupling link at an end opposite said one end directly coupled to said memory controller and a first end of said high speed link pair for coupling said main storage directly to said high speed link pair when said first processor provides said special link coupling address to said memory controller; and
   a second high speed link adapter coupled between said second coupling link at an end opposite said one end directly coupled to said second memory controller and a second end of said high speed link pair opposite said first end for coupling said second main storage of said second processor complex to said high speed link pair when said second processor provides said second special link addresses to said memory controller and thereby couple said second main storage in said second processor complex to said main storage in said first complex.

2. The combination of claim 1 wherein said high speed link pair is an HIPPI pair.

3. The combination of claim 1 wherein said first and second processor complexes each includes a page storage coupled to a page storage control with said first and second coupling links including said page storage control whereby coupling to and from the adapters is through said page storage control and said special link coupling addresses are paging instructions and addresses.

4. A method of providing high speed link coupling between a high speed link and a computer system of the type having a main storage controller coupled to a main storage array for storing and fetching data at a second terminal of said main storage controller as determined by a paging address received at a first terminal of said main storage controller, a central processor and a paging storage system including a page storage bus independent of an I/O bus, a page storage controller, and a page storage array with said page storage bus and said page controller coupled in series between said second terminal of said main storage controller and said page storage array comprising the steps of:

coupling said high speed link to said page storage controller and said page storage bus by an adapter, sending unique paging addresses and instructions from said central processor to said first terminal of said main storage controller causing said main storage controller to couple data between said main storage array and said high speed link; and storing and retiming incoming and outgoing data between said page storage bus and said high speed link at said adapter.

5. A processor complex system for mating to a high speed link comprising:

a central processor providing data, address and control signals, said central processor providing special link addresses, main storage including memory for storing or fetching said data signals according to said address signals, said main storage having a memory controller with first and second terminals for controlling access to said memory, means for coupling said address and control signals from said central processor to said first terminal of said memory controller, an input/output channel bus, a channel processor coupled between said first terminal of said memory controller and said input/output bus, a first coupling link separate from and higher speed than said input/output bus coupled at one end to said second terminal of said memory controller, said memory controller coupling address, data and control signals to and from said main storage over said second terminal bypassing said input/output bus in response to said special link addresses sent to said first terminal of said main storage, and a high speed link adapter including an input and an output buffer coupled at one end to said first coupling link and having high speed link coupling means at the end opposite said one end for coupling data between said high speed link and said main storage.

6. The processor complex of claim 5 wherein said central processor provides said special link addresses and provides acknowledgements, said adapter includes means for generating central processor interrupts and means for receiving said acknowledgements from said central processor, and means for coupling said interrupts and said acknowledgements between said adapter and said central processor.

7. The combination as claimed in claim 6 wherein said high speed link is an HIPPI type link.

8. A multi-clustered system comprising:

m high speed link pairs;

N processor complexes, each processor complex comprising:

a central processor providing data, address and control signals, main storage including a memory controller with first and second terminals for storing or fetching said data signals according to said address signals, means for coupling said address and control signals between said first terminal of said memory controller and said central processor, an input/output channel bus, a channel processor coupled between said second terminal of said memory controller and said input/output bus, a first coupling link separate from and higher speed than said input/output bus coupled at one end to said second terminal of said memory controller for coupling data and control signals to and from said main storage bypassing said input/output bus in response to unique address signals sent from said central processor to said memory controller, N−1 high speed link adapters, each adapter including an input and an output buffer coupled at one end to said first coupling link and coupled at an end opposite said one end to a different one of said m high speed link pairs for coupling data between N−1 said high speed link pairs and said main storage, said m high speed link pairs having said adapters from different processor complexes coupled at opposite ends thereof, said central processor providing said unique address signals to said memory controller for thereby providing data over said first coupling link between said N−1 adapters and said main storage, means at said N−1 adapters for generating central processor interrupts and receiving said acknowledgements from said central processor, and means for coupling said interrupts and said acknowledgements between said N−1 adapters and said central processor.

9. The method of claim 4 including the step of sending interrupt signals to said central processor during the presence of incoming data on said high speed link.

* * * * *